United States Patent [19]

Markessini

[11] 4,161,467

[45] Jul. 17, 1979

[54] REACTIVE CATALYST FOR AMINO RESINS

[75] Inventor: Andrew C. Markessini, Thessaloniki, Greece

[73] Assignee: Teukros A.G., Basel, Switzerland

[21] Appl. No.: 839,248

[22] Filed: Oct. 4, 1977

[30] Foreign Application Priority Data

Oct. 12, 1976 [GR] Greece .......................... 10988/51908
Apr. 27, 1977 [GR] Greece ..................................... 53301

[51] Int. Cl.² .............................................. C08L 61/24
[52] U.S. Cl. ........................... 260/29.4 R; 252/429 R; 428/326; 428/357; 156/62.2; 156/331
[58] Field of Search .............. 252/429 R; 260/29.4 R, 260/69 R, 67.6 R; 428/326

[56] References Cited

U.S. PATENT DOCUMENTS

| | | | |
|---|---|---|---|
| 3,697,355 | 10/1972 | Black | 156/331 |
| 3,826,770 | 7/1974 | Christensen et al. | 260/29.4 R |
| 3,842,039 | 10/1974 | Vargiv et al. | 260/69 R |
| 3,905,847 | 9/1975 | Black | 428/326 |
| 4,075,149 | 2/1978 | Lakshmanan | 260/29.4 R |
| 4,082,904 | 4/1978 | Bornstein | 428/528 |

Primary Examiner—Patrick Garvin
Assistant Examiner—P. E. Konopka
Attorney, Agent, or Firm—Ladas, Parry, Von Gehr, Goldsmith & Deschamps

[57] ABSTRACT

A reactive catalyst for the polycondensation of amino resins used for bonding water-penetrable cellulosic particles is disclosed. Said catalyst, if used in combination with a known catalyst, increases the rate of polycondensation of the resin while at the same time allowing the use of lower amounts of resin solids without imparting any loss in bonding strength. The catalyst comprises a concentrated aqueous solution of a mixture of organic and inorganic components, the organic components being formaldehyde and urea or a non resinous condensation product of formaldehyde and urea, and the inorganic component being a water-soluble alkali metal halide.

7 Claims, No Drawings

REACTIVE CATALYST FOR AMINO RESINS

The present invention relates to a reactive catalyst comprised of a mixture of organic and inorganic components, whereby the addition of such a catalyst to amino resins used for bonding water-penetrable cellulosic particles, allows lower amounts of resin solids to be used while at the same time increasing the rates of production without imparting any loss in bonding strength.

The catalyst is comprised mainly of an organic and an inorganic component. The organic component is a concentrated solution of formaldehyde with urea (said solution of formaldehyde with urea is comprised of the monomers or of a non resinous condensation product of these monomers), while the inorganic component is an alkali halide.

The curing rate is increased at high temperatures to such levels as may never be reached by the simple addition of acid-curing catalysts. The addition of acid-curing catalysts increases the curing rate, but such a level is then reached whereby further increase causes the degradation of the properties of the bonded material.

Furthermore, the addition of the well-known catalysts to higher levels allows the polycondensation to proceed even at room temperature (in spite of the addition of retarders such as ammonia or hexamethylenetetramine). This reduces the shelf life of the glue at room temperature, causing precuring before the introduction of the mat in the press and resulting in the well-known handicaps of such a phenomenon.

The addition, however, of the catalyst according to the present invention may increase even further the curing rates and subsequently reduce pressing times, without causing any degradation of the properties of the bonded material. The addition of said catalyst causes a reaction only at high temperatures. It therefore substantially increases the polycondensation rates of the resin at the temperature of the press without increasing it at all at room temperatures, thus avoiding any precuring problems. The said catalyst is combined with, and becomes part of, the resin itself.

The combination of an organic with an inorganic component in the catalyst exhibits a synergistic behavior. If the single components are added alone to the resin they do exhibit a certain increase in the curing rate, but when added in a combination, they exhibit an increase which is higher than the sum of the results obtained when each component is added separately. Preferably the ratio of the organic to the inorganic component of the catalyst is 0.1 to 1.5 parts by weight of the organic component to 1 part by weight of the inorganic component, the amount of water depending on the solubility of the organic and inorganic components and the solids content required for the production system used.

The halide salt may be any soluble halide of an alkali metal.

The organic material may be a nonresinous condensate of urea with formaldehyde.

It is preferable to also add a surface active agent to the catalyst in small quantities, such as 0.1–2%, to improve the resin dispersion.

The catalyst according to the present invention (calculated as 100% solids content) may be added in various proportions and more precisely 1 to 30% of the resin solids used. The most important aspect of the present invention is the fact that the catalyst may be substituted for part of the resin without lowering the properties of the final product. This is achieved not by adding the catalyst in quantities equal to the quantity of resin substituted, but by adding said catalyst in quantities from 50 to 70% of the amount of resin substituted (calculations referred to by weight and referring to all products as 100% solids).

The catalyst according to the present invention may, because of its synergistic behavior, be substituted for the resin in quantities up to twice its own weight. The above mentioned characteristic of said catalyst is exhibited for an addition of up to 20% of the weight of the resin, corresponding to a substitution of up to 40% of the weight of the used resin.

When added to lower amounts, e.g., 3 to 10% there is a considerable increase in the properties of the end product.

When added to higher levels i.e. up to 30%, no difference is imparted to the properties of the end product but it considerably increases the curing rates and the resin saved.

Bonding is effected by curing the resin at elevated temperatures and pressures according to the methods well known in the art. The catalyst may be used in all types of products where amino resins are used for bonding lignocellulosic products, whether these are wood particles for particleboard production using flat press, or calender or wood veneers such as in plywood production.

The quality of boards produced was controlled weekly for a period of six months and no reduction in the properties was observed.

This proves that no polymer degradation occurs and that the ageing properties of the boards are comparable to the ones normally produced.

Substituents so far known in the art to substitute resin have not succeeded in keeping the same methods of production well known in the art for the higher substitutions while they have not conferred a simultaneous increase in the speed of production.

In particular, the known substituents are halide salts without using the mixture of halide salt with the urea and formaldehyde additions.

The addition of the halide salt alone succeeds in substituting part of the resin with the following limitations as compared to the reactive catalyst according to the present invention.

1. The rate of production is not increased, in the case of higher substitutions it is actually decreased, the substituents acting as retarders instead of as catalysts because of the high amount of water present.

2. Substitution is obtained in ratios of 1:1 while in the case of the reactive catalyst according to the present invention it is up to 1:2.

3. Higher substitutions are obtained by means of a separate spraying of wood with the halide salt solution with subsequent drying followed by spraying of the adhesive. In the case of the reactive catalyst according to the present invention, higher substitutions are obtained without the need to spray the reactive catalyst separately and dry subsequently. The reactive catalyst is added to the resin solution and this solution is used to spray the wood furnish in one step according to the methods well known in the art.

The reactive catalyst according to the present invention provides yet another advantage.

Due to the lower quantity of resin used and improved performance achieved, the amount of free formaldehyde in the production hall and boards is considerably reduced and the boards resulting are nearly odorless.

The following examples are presented in illustration of the invention and are not intended as limitations.

EXAMPLE 1

A constant amount of urea formaldehyde resin (BASF 285) is reacted under controlled conditions of temperature and pressure with the catalyst according to the present invention, said catalyst varying according to the proportions of the constituents making up the catalyst solution.

The latter is not used alone but in addition to the usual catalyst well known in the art, which consists usually of ammonium chloride, comprising hexamethylenetetramine or not.

In table No. 1 the synergic effect of the catalyst solution comprised of the organic and inorganic components is clearly illustrated.

Sample 1 which is considered to be the blank and does not include the catalyst solution according to the present invention but only the well-known ammonium chloride as a catalyst, has a gel time of 90 seconds at 100° C.

Sample 2 comprises, apart from ammonium chloride, also a certain quantity of urea-formaldehyde, and exhibits a slightly increased catalytic effect with a gel time of 85 seconds at 100° C.

Sample 3 comprises, apart from ammonium chloride, also a certain quantity of sodium chloride but no urea formaldehyde, and exhibits a slightly increased catalytic effect with a gel time of 80 seconds at 100° C.

Sample 4 comprises, apart from ammonium chloride, a mixture of urea formaldehyde with sodium chloride, the total sum of the mixture added being equal to the amount of the single components added in samples 2 and 3. Samples 4, 5 and 6 present an increased catalytic effect, due to the synergistic behavior of the components used and the gel times obtained at 100° C. are 60, 35 and 28 seconds respectively.

The difference between samples 4, 5 and 6 results from the different proportions of the organic component used in comparison to the inorganic component of the catalyst solution.

It is noticed that sample 6, comprising the higher amount of organic material, also presents the greater catalytic effect.

Table No. 1

| Components in parts by weight | Samples | | | | | |
|---|---|---|---|---|---|---|
| | 1 | 2 | 3 | 4 | 5 | 6 |
| Urea formaldehyde resin (65% solids content) | 140 | 140 | 140 | 140 | 140 | 140 |
| Water | 70 | 10 | 10 | 10 | 10 | 10 |
| Catalyst solution | — | 60 | 60 | 60 | 60 | 60 |
| Ammonium chloride (20% solution in water) | 12 | 12 | 12 | 12 | 12 | 12 |
| Hexamethylenetetramine (20% solution in water) | 8 | 8 | 8 | 8 | 8 | 8 |
| Gel time in seconds at 100° C. | 90 | 85 | 80 | 60 | 35 | 28 |

| Components of catalyst solution | Parts by weight | | | | | |
|---|---|---|---|---|---|---|
| Urea (100%) | — | 5.35 | — | 5.35 | 10.70 | 16.05 |
| Formaldehyde (100%) | — | 2.75 | — | 2.75 | 5.50 | 8.25 |
| Sodium chloride (100%) | — | — | 20.0 | 20.0 | 20.0 | 20.0 |
| Surface active agent (10% solution in water) | — | 1.0 | 1.0 | 1.0 | 1.0 | 1.0 |
| Water | — | 90.9 | 79.0 | 70.9 | 62.8 | 54.7 |
| Total | — | 100.0 | 100.0 | 100.0 | 100.0 | 100.0 |

EXAMPLE 2

The present example illustrates the advantages obtained in the particleboard production when the catalyst according to the present invention is added to the formulation.

Three cases are presented whereby the same total quantity of solution is used. The differences occur in the different proportions of the various components of the solution used as shown in table No. 2. It is noted that column A refers to the solution used to spray fine wood dust which is used in turn to form the external surfaces of the particleboard, while column B refers to the solution used to spray wood flakes which are used in turn to form the core of the particleboard.

The particleboard is produced in the present example according to the Bison system, i.e., with continuous layer formation under controlled conditions which are kept constant for all the cases presented.

| Moisture of mat before the press: | 10.5 ± 0.5% |
|---|---|
| Press temperature: | 210° C. |
| Pressure: | 36 kg/cm² |

The qualities of the particleboard produced do not present any appreciable differences in all three cases. (See results in table 2).

The various solutions prepared in the three cases according to the present example succeed in reducing the pressing times as follows:

Sample No. 1: 9.25 seconds per mm nonsanded particleboard

Sample No. 2: 8.00 seconds per mm nonsanded particleboard

Sample No. 3: 7.00 seconds per mm nonsanded particleboard

The third sample includes the largest amount of organic component as compared to the inorganic component and presents the most successful results.

The present example proves that the use of the catalyst according to the present invention makes it possible to reduce the pressing time in particleboard production and simultaneously allows the reduction of resin-usage when using said catalyst by up to 30%. 16,90% (sample 2) or 21% (sample 3).

Table No. 2

| Components in parts by weight | Samples | | | | | |
|---|---|---|---|---|---|---|
| | 1 | | 2 | | 3 | |
| | A | B | A | B | A | B |
| Urea formaldehyde resin (65% solids content) | 100.0 | 200.0 | 70.0 | 140.0 | 70.0 | 140.0 |
| Ammonium chloride (20% solution in water) | — | 8.0 | — | 8.0 | — | 8.0 |
| Water | 68.5 | 31.0 | 58.5 | 20.0 | 58.5 | 20.0 |
| Ammonia 25° BAUME | 1.5 | 1.0 | 1.5 | 2.0 | 1.5 | 2.0 |
| Catalyst solution | — | — | 40.0 | 70.0 | 40.0 | 70.0 |
| Total | 170.0 | 240.0 | 170.0 | 240.0 | 170.0 | 240.0 |
| Components of catalyst solution | | | | | | |
| Urea (100%) | — | — | 5.35 | 5.35 | 10.70 | 10.70 |
| Formaldehyde (100%) | — | — | 2.75 | 2.75 | 5.50 | 5.50 |
| Sodium chloride (100%) | — | — | 20.0 | 20.0 | 20.0 | 20.0 |
| Surface active agent (10% solution in water) | — | — | 1.0 | 1.0 | 1.0 | 1.0 |
| Water | — | — | 70.9 | 70.9 | 62.8 | 62.8 |
| Total | — | — | 100.0 | 100.0 | 100.0 | 100.0 |

| Properties | Sample | | |
|---|---|---|---|
| | 1 | 2 | 3 |
| Density, kg/m$^3$ | 660 | 640 | 625 |
| Thickness in mm | 16.2 | 16.0 | 16.1 |
| Modulus of elasticity L | 26000 | 23200 | 24000 |
| Tensile strength, kp/cm$^2$ | 5.0 | 4.5 | 4.2 |
| Bending strength, kp/cm$^2$ | 250 | 230 | 225 |
| Water absorption, percent at 24 hours immersion | 40 | 45 | 52 |
| Swelling, percent increase at 24 hours immersion | 13 | 15 | 20 |

EXAMPLE 3

The present example illustrates the increase in the rate of particleboard production obtained when the catalyst according to the present invention is added to the formulation (i.e., a mixture of sodium chloride and urea formaldehyde monomers) as compared to the rate obtained by the simple addition of sodium chloride (without urea formaldehyde monomers).

The results are reported in table 3 where sample 1 contains only sodium chloride apart from the usual additives added to the resin formulation for particleboard production, and has, therefore, a gel time of 80 seconds while sample 2 contains the same additives as sample 1 but also urea and formaldehyde monomers, as well as the same quantity of sodium chloride and has therefore a gel time of 28 seconds.

The particleboards obtained under the same conditions using a Bison line for both samples of the present example, gave a rate of production of 9 seconds per mm in the case of sample 1 and 7 seconds per mm in the case of sample 2.

The mechanical properties obtained according to DIN 52360 to 52365 were equivalent in both cases.

Table No. 3

| | Samples | |
|---|---|---|
| | 1 | 2 |
| Urea formaldehyde resin (65% solids content) | 140 | 140 |
| Water | 58 | 43.42 |
| Ammonium chloride (20% solution in water) | 12 | 12 |
| Hexamethylenetetramine | 8 | 8 |
| Sodium chloride (100%) | 12 | 12 |
| Urea (100%) | — | 9.63 |

Table No. 3-continued

| | | |
|---|---|---|
| Formaldehyde (100%) | — | 4.95 |
| Total | 230.00 | 230.00 |
| Gel time in seconds | 80 | 28 |
| Presstime in seconds per mm thickness of nonsanded particleboard | 9 | 7 |

| Properties | Sample | |
|---|---|---|
| | 1 | 2 |
| Density, kg/m$^3$ | 660 | 640 |
| Thickness in mm | 16.05 | 16.20 |
| Modulus of elasticity L | 24500 | 23200 |
| Tensile strength, kp/cm$^2$ | 6.0 | 5.2 |
| Bending strength, kp/cm$^2$ | 235 | 240 |
| Water absorption, percent at 24 hours immersion | 45 | 60 |
| Swelling, percent increase at 24 hours immersion | 13.4 | 14.0 |

EXAMPLE 4

The present example illustrates the increased substitution of urea formaldehyde resin obtained by adding the catalyst according to the present invention as compared to the smaller substitution obtained by using only sodium chloride without the addition of urea and formaldehyde monomers, while obtaining particleboards in both cases having equivalent mechanical properties.

This example illustrates in particular that the substitution in the case of sodium chloride to resin is 1:1 while in the case of the mixture of sodium chloride with urea and formaldehyde the resin substitution is 1:2.

A furnish of wood chips after pulverization was treated with the corresponding compositions given in table 4.

Composition 1 is considered to be a blank without resin substitution.

The compositions differ in that in composition 2 we have a substitution of resin solids only with sodium chloride while in the third composition (composition according to the present invention) we have a substitution of resin by the mixture of sodium chloride with urea formaldehyde monomers.

In composition 2, 19.5 parts of solid resin are substituted by 19.5 parts of solid sodium chloride.

In composition 3, 39 parts of solid resin are substituted by 19.5 parts of solid reactive catalyst (i.e., sodium chloride, urea and formaldehyde).

We have with composition 1, therefore, a substitution of 1:1 while with composition 2 a substitution of 1:2 is obtained.

The particleboard produced with both formulations have equivalent mechanical properties even though composition 3 has a lower solids content.

In both cases the particleboards are produced according to the Bison system, i.e., with continuous layer formation under controlled conditions which are kept constant for both cases presented.

Moisture of mat before the press 10.5 ± 0.5%
Press temperature 210° C.
Pressure 35 kg/cm$^2$ The quality of the particleboard produced is reported in the following table 4.

EXAMPLE 5

The novelty of our present invention is further illustrated by the fact that when high levels of substitution are desired it is absolutely necessary to use the formulation according to our invention in order to spray the furnish in one step as is practiced in all types of systems used for particleboard production.

If only sodium chloride is added to the resin without the addition of urea and formaldehyde monomers, apart from the fact that speed is slow as already shown in previous examples, a separate spraying of the wood chips with sodium chloride is also necessary, with subsequent drying of the wood mixture and further spraying with adhesive.

This means extra machinery, which is costly, and lower production.

The extra steps are necessary because of the low solubility of sodium chloride in water and also because in this case substitution of the resin is obtained by adding an amount in solids content equal to the solids of resin substituted. In order to substitute high levels of resin, too much water is necessary in the formulation which cannot be dried in one step in the press within normal press times.

The formulation according to our present invention may very well be used to substitute high levels of resin Table No. 4

|  | Samples | | | | | |
|---|---|---|---|---|---|---|
|  | 1 | | 2 | | 3 | |
| Components in parts by weight | A | B | A | B | A | B |
| Urea formaldehyde resin | 100 | 200 | 90 | 180 | 80 | 160 |
| Solids of urea formaldehyde resin | 65 | 130 | 58.5 | 117.00 | 52 | 104.0 |
| Ammonium chloride (20% solution) | — | 8.0 | — | 8.0 | — | 8.0 |
| Water | 68.5 | 31 | 72.0 | 38.0 | 66.17 | 26.33 |
| Ammonia 25° BAUME | 1.5 | 1.0 | 1.5 | 1.0 | 1.5 | 1.0 |
| Sodium chloride 100% | — | — | 6.5 | 13.0 | — | — |
| Sodium chloride A + B | — | | 19.5 | | — | |
| [1]Reactive catalyst 100% solids | — | — | — | — | 6.5 | 13.0 |
| Reactive catalyst 100% solids A + B | — | | — | | 19.5 | |
| Water | — | — | — | — | 15.83 | 31.67 |
| Total resins solution | 170.00 | 240.00 | 170.00 | 240.00 | 170.00 | 240.00 |
| Total solids content | 65 | 131.6 | 65.0 | 131.6 | 58.50 | 118.60 |
| % solids content | 38.2 | 54.8 | 38.2 | 54.8 | 34.4 | 49.4 |
| Parts of resin solids substituted | — | — | 65. | 13.0 | 13.0 | 26.0 |
| Parts of resin solids A substitution A + B | | — | | 19.5 | | 39.0 |
| % resin substituted A + B | | — | | 10 | | 20 |
| Ratio of added solid substituent to resin solids substituted | | — | | 1:1 | | 1:2 |

|  | Sample | | |
|---|---|---|---|
| Properties | 1 | 2 | 3 |
| Density, kg/m$^3$ | 645 | 630 | 625 |
| Thickness in mm | 16.1 | 16.5 | 16.2 |
| Modulus of elasticity L | 24500 | 25000 | 23800 |
| Tensile strength, kp/cm$^2$ | 4.5 | 5.0 | 4.8 |
| Bending strength, kp/cm$^2$ | 235 | 223 | 240 |
| Water absorption, percent at 24 hours immersion | 45 | 50 | 53 |
| Swelling, percent increase at 24 hours immersion | 14 | 17 | 16 |

[1]Components of reactive catalyst

| Urea | 19 |
|---|---|
| Formaldehyde 100% | 10 |
| Sodium chloride 100% | 71 |
| Total | 100 | without using too much water and allowing the production in one step, as is normally done for particleboard production, without any changes at all in the production steps.

This is possible in our case because on the one hand we have a higher solubility in water and therefore less water, but also because the substitution is obtained by adding only half the quantity of substituted material, calculated as solid matter.

As a matter of fact, in order to obtain the same level of high substitution (35% in the present example) using the reactive catalyst according to the present invention, we have a shorter gel time and therefore higher speed of production (formulation 3). In the case of using only sodium chloride without the addition of urea and formaldehyde monomers, we have a much higher gel time, the added substituents acting in this case as retarders instead of catalysts (formulation 2). All these mentioned points are proved in the formulations presented in table 5.

In this table we present three formulations.

Formulation 1 is considered as a blank whereby resin is used without any substituents. Formulation 2 contains only sodium chloride to substitute the resin and formulation 3 contains the reactive catalyst according to the present invention, i.e., a mixture of sodium chloride and urea formaldehyde monomers. The percentage of substituted resin is 35% in both formulations 2 and 3.

In formulation 3, 37.5 parts of reactive catalyst are added to substitute 68.5 parts of solid resin, while in formulation 2, 68.5 parts of sodium chloride are added to obtain the same amount of substituted resin, i.e., 68.5 parts of resin.

This proves the point claimed that a substitution of 1:1.8 is obtained while by using only sodium chloride there is a substitution of 1:1.

The total resin solution of formulation 3 which contains the reactive catalyst according to the present invention is kept the same as in formulation 1.

This was not possible in the case of formulation 2, whereby only sodium chloride is added because of the high amount of water necessary in the formulation due to the high resin substitution.

The gel time of the blank is 60 seconds. In formulation 3 containing the reactive catalyst we have a lower gel time of 40 seconds which permits faster production rates; in formulation 2, where only sodium chloride is used, gel time is 110 seconds, the components added acting as retardants instead of as catalysts.

Column A in all 3 cases refers to the solution used to spray fine wood dust which is used in turn to form the external surfaces of the particleboard, while column B in all 3 cases refers to the solution used to spray wood flakes which are used to form the core of theparticleboard.

Particleboards are produced using the resin formulations as described in the three cases in table 5. The production method used was the Bison system and the conditions were kept constant for all three cases presented.

Moisture of mat before the press: 10.5 ± 0.5%
Press temperature: 210° C.
Pressure: 35 kg/cm$^2$ The quality of the particleboard produced corresponded to the standards DIN 52.360 to 52.365 and did not present any differences in cases 1 and 3.

In case 2, containing only the sodium chloride instead of the reactive catalyst according to the present invention, the properties of the particleboard obtained could not be measured because the boards obtained were already expanded under normal press times.

The proves that sodium chloride used by itself cannot give such high substitutions of the order of 35% when used to produce particleboard with one spraying step according to the method well known in the art.

Table No. 5

|  | 1 | | 2 | | 3 | |
| --- | --- | --- | --- | --- | --- | --- |
|  | A | B | A | B | A | B |
| Urea formaldehyde resin | 100 | 200 | 65 | 130 | 65 | 130 |
| Solids of resin | 65 | 130 | 42 | 84.5 | 42 | 84.5 |
| Ammonium chloride (20% solution) | — | 8 | — | 8 | — | 8 |
| Water | 68.5 | 31 | — | — | 68.5 | 31 |
| Ammonia 25° BAUME | 1.5 | 1.0 | 1.5 | 1.0 | 1.5 | 1.0 |
| Sodium chloride (100%) | — | — | 23 | 45.5 | — | — |
| Sodium chloride A + B |  | — |  | 68.5 |  | — |
| [1]Reactive catalyst (100%) | — | — | — | — | 12.5 | 25 |
| Reactive catalyst A + B |  | — |  | — |  | 37.5 |
| Water | — | — | 82 | 161.5 | 22.5 | 45 |
| Total resin solution | 170 | 240 | 213.5 | 346.0 | 170.0 | 240 |
| Total solids content | 65 | 131.6 | 65 | 131.6 | 54.5 | 111.1 |
| % solids content | 38.2 | 54.8 | 30.5 | 38 | 54 | 53 |
| Parts of solid resin substituted | — | — | 23 | 45.5 | 23 | 45.5 |
| Parts of solid resin substituted A + B |  |  |  | 68.5 |  | 68.5 |
| % resin substituted A + B |  | — |  | 35 |  | 35 |
| Ratio of added solid substitutent to resin solids substituted | — |  |  | 1:1 |  | 1:1.8 |
| Gel time in seconds |  | 60 |  | 110 |  | 40 |

[1]Components of reactive catalyst    %
Urea (100%)    30

Table No. 5-continued

| | |
|---|---|
| Formaldehyde (calculated as 100% solids | 15 |
| Sodium chloride (100%) | 55 |

EXAMPLE 6

The present example illustrates the synergistic behavior obtained when a mixture of sodium chloride is added together with the nonresinous condensation product of urea and formaldehyde monomers to the resin formulation.

The results are reported in table 6 where sample 1 contains only sodium chloride, apart from the usual additives added to the resin formulation for particleboard production, and has a gel time of 49 seconds. Sample 2 contains a urea-formaldehyde condensate and has a gel time of 51 seconds, and samples 3 and 4 both contain sodium chloride and a urea-formaldehyde condensate, the sum of which equals the amount of sodium chloride used in sample 1, all calculated as 100% solids. Both samples 3 and 4 have a gel time lower than samples 1 and 2 and in particular, both samples 3 and 4 have a gel time of 42 seconds.

Table No 6

| | 1 | 2 | 3 | 4 |
|---|---|---|---|---|
| Urea formaldehyde resin (65% solids content) | 140 | 140 | 140 | 140 |
| Ammonium chloride (20% solution in water) | 8 | 8 | 8 | 8 |
| Ammonia 25° BAUME | 2 | 2 | 2 | 2 |
| Sodium chloride (100%) | 12 | — | 8.55 | 5.5 |
| Urea (100%) | — | 1.73 | 1.73 | 3.16 |
| Formurea[1] (80% solution) in water) | — | 2.15 | 2.15 | 4.18 |
| Water | 64 | 72.12 | 63.57 | 63.16 |
| Total | 226 | 226 | 226 | 226 |
| Gel time in seconds at 100° C. | 49 | 51 | 42 | 42 |

[1]Formurea is a low condensate of the following composition:
55 parts by weight formaldehyde
25 parts by weight urea
20 parts by weight water.

EXAMPLE 7

The present example illustrates the synergistic behavior obtained when a mixture of potassium chloride is added together with the condensation product of urea and formaldehyde monomers to the resin formulation.

The results are reported in table 7, whereby sample 1 is the blank with water instead of the catalyst according to the present invention. Sample 2 contains potassium chloride and sample 3 contains a mixture of potassium chloride together with a condensate of urea and formaldehyde monomers.

Sample 1 has a gel time of 93 seconds, sample 2 shows a slight catalytic effect with a gel time of 82 seconds but sample 3, which contains the reactive catalyst according to the present invention, shows a surprisingly high catalytic effect with a gel time of 42 seconds.

Table No. 7

| | 1 | 2 | 3 |
|---|---|---|---|
| Urea formaldehyde resin (65% solids content) | 140 | 140 | 140 |
| Ammonium chloride (20% solution in water) | 8 | 8 | 8 |
| Ammonia 25° BAUME | 3 | 3 | 3 |
| Potassium chloride (100%) | — | 12 | 12 |
| Urea (100%) | — | — | 7.38 |
| Formurea[1] (80% solution in water) | — | — | 9 |
| Water | 75 | 63 | 46.62 |
| Total | 226 | 226 | 226 |
| Gel time in seconds at 100° C | 93 | 82 | 42 |

(1) Formurea is a low condensate of the following composition:
55 parts by weight formaldehyde
25 parts by weight urea
20 parts by weight water.

EXAMPLE 8

The present example refers to production of veneered particleboard. It illustrates more precisely the fact that the catalyst according to the present invention may be used also for glueing together flat sheets such as for the production of plywood, blockboard, veneered boards or other multilayer boards. In this case, a sheet of veneer of the Tianna type, having 0.6 mm thickness and a moisture content of 10%, is glued onto both faces of a sanded particleboard having 15 mm. thickness, size 183 × 305 cm. and moisture content of 9%.

The glue is spread on to the particleboard by means of a glue spreading machine.

The boards are pressed with a pressure of 7 kp/cm$^2$ and at a temperature of 120° C.

Two samples are presented. Sample 1 uses the normal glue formulation while sample 2 uses a formulation according to the present invention. The formulations are shown in table 8.

While the boards produced with the formulation according to sample 1 need a pressing time of 2 minutes, boards produced with the formulation according to sample 2 need a pressing time of 1.7 minutes.

The glue formulation using the catalyst according to the present invention for the production of veneered particleboard has therefore the following advantages:
Increase in speed of production of 15%.
Glue saving of 26%.

Table No 8

| | 1 | 2 |
|---|---|---|
| Urea formaldehyde resin (65% solids content) | 100 | 70 |
| Ammonium chloride (20% solution in water) | 8 | 8 |
| Sodium chloride | — | 6.00 |
| Urea (100%) | — | 1.62 |
| Formaldehyde (100) | — | 0.83 |
| Water | — | 21.55 |
| Flour | 7 | 10 |
| Total | 115 | 118 |

EXAMPLE 9

The present example illustrates the synergistic behavior obtained when a mixture of sodium chloride is added together with urea and formaldehyde monomers to a resin formulation based on melamine-formaldehyde resin. The resin used is Kauramin 542 of BASF.

The results are reported in table 9. Sample 1 is a blank. Sample 2 contains, apart from the usual formulation of resin, ammonium chloride and ammonia, also sodium chloride. Sample 3 contains, apart from the usual formulation of resin, ammonium chloride and ammonia, also urea and formaldehyde.

All these samples have the same gel time, i.e., 65 seconds.

Sample 4 contains, apart from the usual formulation of resin, ammonium chloride and ammonia, also urea, formaldehyde and sodium chloride, the total sum of the mixture added being equal to the amount of the single components added in samples 2 and 3.

Sample 4 represents, therefore, an example of the catalyst according to the present invention and it actually has a much lower gel time, i.e., 48 seconds.

Table No. 9

|  | 1 | 2 | 3 | 4 |
|---|---|---|---|---|
| Melamin-formaldehyde resin (65% solids content) | 140 | 140 | 140 | 140 |
| Ammonium chloride (20% solution in water) | 8 | 8 | 8 | 8 |
| Ammonia 25° BAUME | 2 | 2 | 2 | 2 |
| Sodium chloride (100) | — | 12 | — | 12 |
| Urea (100%) | — | — | 3.2 | 3.2 |
| Formaldehyde (100%) | — | — | 1.65 | 1.65 |
| Water | 76 | 64 | 71.15 | 59.15 |
| Total | 226 | 226 | 226 | 226 |
| Gel time in seconds at 100° C. | 65 | 65 | 65 | 48 |

Similar results may be obtained, if in the preceding examples the sodium or potassium chloride is replaced by lithium chloride or the fluorides, bromides or iodides of sodium, potassium or lithium.

What is claimed is:

1. A material for bonding together water-penetrable cellulosic particles which comprises: an amino resin, and
   1 to 30% by weight of a catalyst system, calculated as 100% solids and based on the weight of the amino resin, to effect polycondensation of the amino resin, said catalyst system comprising an aqueous solution of an organic component and an inorganic component wherein the organic component is formaldehyde and urea or a nonresinous condensation product of formaldehyde and urea and the inorganic component is a water-soluble alkali metal halide.

2. The material defined in claim 1 wherein the amino resin is urea-formaldehyde.

3. The material defined in claim 1 wherein the amino resin is melamine-formaldehyde.

4. The material defined in claim 1 wherein the alkali metal halide is sodium chloride.

5. The material defined in claim 1 wherein the ratio of the organic component to the inorganic component of the catalyst system is 0.1 to 1.5 parts by weight of the organic component to 1.0 part by weight of the inorganic component, and wherein the amount of water in said catalyst system is dependent upon the solubility of the organic and the inorganic components.

6. The material defined in claim 1 wherein the catalyst system further comprises a surface active agent in an amount of 0.1 to 2% by weight of the catalyst system.

7. The material defined in claim 1 wherein 8 to 12 parts of ammonium chloride by weight are added per 70 to 160 parts by weight of a solution of the amino resin.

* * * * *